United States Patent [19]

Giesenberg

[11] 4,294,128
[45] Oct. 13, 1981

[54] DEVICE FOR ERECTING AND STABILIZING A GYRO VERTICAL

[75] Inventor: Peter Giesenberg, Uhldingen-Mühlhofen, Fed. Rep. of Germany

[73] Assignee: Bodenseewerk Gerätetechnik Überlingen, Fed. Rep. of Germany

[21] Appl. No.: 6,079

[22] Filed: Jan. 23, 1979

[30] Foreign Application Priority Data

Sep. 6, 1978 [DE] Fed. Rep. of Germany ....... 2838740

[51] Int. Cl.³ .............................................. G01C 19/50
[52] U.S. Cl. ......................................... 74/5.44; 74/5.8
[58] Field of Search ........................... 74/5.44, 5.8, 5.5

[56] References Cited

U.S. PATENT DOCUMENTS

| 1,311,768 | 7/1919 | Gray et al. | 74/5.44 |
| 1,524,709 | 2/1925 | Gray | 74/5.44 |
| 2,439,418 | 4/1948 | Davenport | 74/5.44 |

FOREIGN PATENT DOCUMENTS

| 636105 | 2/1962 | Canada | 74/5.44 |
| 1974279 | 8/1967 | Fed. Rep. of Germany | |
| 130697 | 8/1919 | United Kingdom | 74/5.44 |
| 132944 | 10/1919 | United Kingdom | 74/5.44 |
| 161595 | 4/1921 | United Kingdom | |

Primary Examiner—Rodney H. Bonck
Attorney, Agent, or Firm—Howard H. Darbo

[57] ABSTRACT

The invention relates to a device for erecting and stabilizing of a gyro vertical, comprising a disc arranged on the gyro housing and perpendicular to the gyro axis, said disc being driven in the same sense as the gyro rotor but at a reduced rate as compared thereto, and having at least one guideway, in which a mass is movably guided, the guideway being arranged such that the disc with the mass is balanced with respect to the gyro axis, when the mass abuts the rear end, with respect to the rotary movement, of the guideway, and that the movement of the mass in the guideway causes an erecting torque, when the gyro spin axis deviates from the vertical direction observed.

16 Claims, 13 Drawing Figures

DEVICE FOR ERECTING AND STABILIZING A GYRO VERTICAL

BACKGROUND OF THE INVENTION

Gyro verticals serve the purpose of providing in a vehicle, for example a ship or an airplane, a reference direction, which is aligned with the true vertical and independent of pitch or roll movements of the vehicle and with respect to which such pitch or roll movements can be measured. Such a gyro vertical is used, for example, in an airplane as "artificial horizon." A gyro vertical comprises a gyro rotor rotating at high rotational speed in a gyro housing which is gimbal suspended within the vehicle. The gyro spin axis is aligned with the vertical. As the gyro tends to maintain its orientation in space this orientation is retained even if the vehicle makes pitch or roll movements.

Due to disturbing torques which, for example, are caused by friction in the gimbal bearings, the gyro has a drift, i.e. the gyro deviates slowly from the vertical direction, even if it had been aligned accurately therewith in the beginning. Therefore it is necessary to provide a device, which, at first, aligns the gyro spin axis with the vertical direction (erects it) and which then stabilizes this vertical direction against disturbing torques (stabilizes it).

To erect and stabilize a gyro vertical, it is known (U.S. Pat. No. 1,311,768) to arrange a disc on the gyro housing perpendicular to the gyro spin axis, said disc being driven in the same sense as the gyro rotor but with reduced rotational speed as compared thereto. In the prior art device, this disc has three arcuate guideways along its periphery, which are curved around the gyro spin axis and are angularly spaced by 120°. A mass in the form of a ball is movably guided in each of these guideway portions and is supported on a raceway, which is located below the rotating disc and stationary with respect to the housing. When the disc rotates about an exactly vertical axis, the balls will abut the rear end, with respect to the rotary movement, of each arcuate guideway portion and will be taken along by the disc against the frictional forces acting on the balls. Thus in this state the balls are angularly spaced by 120°, and the disc with the balls is balanced with respect to the gyro spin axis. Therefore the disc does not exert any torque on the gyro. When, however, the gyro axis is tilted with respect to the vertical, the balls conveyed "uphill" during the revolution of the disc will be taken along by the rear ends of the arcuate guideway portions against the action of gravity and remain in abutment therewith, while the respective balls running "downhill" will leave the associated rear end of the guideway portion under the action of gravity, and thus will change its angular position with respect to the gyro spin axis. Then the disc with the balls is no longer balanced and exerts a torque on the gyro spin axis. This torque is directed to cause erection of the gyro spin axis.

Other designs described in U.S. Pat. No. 1,311,768 show other forms of guideways, balls which are arranged in a continuous circular guideway and are moved by radially projecting, rotating driving arms angularly spaced by 120°, and arrangements with masses with radial levers which are mounted for rotation about a central axis, said masses being taken along by axially projecting engaging pieces, which rotate relative to the gyro housing in the same sense as the gyro rotor. It has also been proposed already in U.S. Pat. No. 1,311,768 to use quantities of liquid instead of the balls.

The usual deviations of the gyro spin axis from the vertical direction, which are caused by disturbing torques, amount to few degress only. With heavy horizontal accelerations, for example during turns, there will be, however, larger deviations between the gyro spin axis and the apparent vertical occurring due to the acceleration. The gyro vertical has to be prevented from tending to align itself with the apparent vertical during such short-time acceleration phases. When a predetermined level of deviation of the gyro spin axis from the vertical is exceeded, this fact can be regarded as an indication that such a short time acceleration is acting on the system. During such acceleration phase the device for erecting the gyro vertical has to be disabled. Various designs for this purpose are known.

In a prior art device (German utility model No. 1,974,279), erection of the gyro vertical is caused by a ball which is movable in a guideway between stops. A counter-pendulum weight causes this movable ball to be arrested, as soon as the deviation of the gyro spin axis from the oberved vertical direction exceeds a predetermined level. Such designs with counter-pendulum weights for arresting masses are expensive and susceptible to trouble.

In the prior art designs the erecting torque is provided by displacing the masses only along an arc extending through a limited angle along the periphery of the disc.

SUMMARY OF THE INVENTION

It is the object of the invention to shape the guideway in such a manner that deviation of the gyro spin axis from the vertical direction will cause the masses to be displaced to an increased extent in the sense to provide an erecting torque.

According to the invention this object is achieved in that the guideway is generally S-shaped and extends from one end located near the edge of the disc around the gyro spin axis to an end located near the gyro spin axis.

Further modifications of the invention are subject matter of the sub-claims.

BRIEF DESCRIPTION OF THE DRAWING

Embodiments of the invention are described in greater detail hereinbelow with reference to the accompanying drawings.

DESCRIPTION OF THE PREFERRED EMBODIMENT

Figure 1:
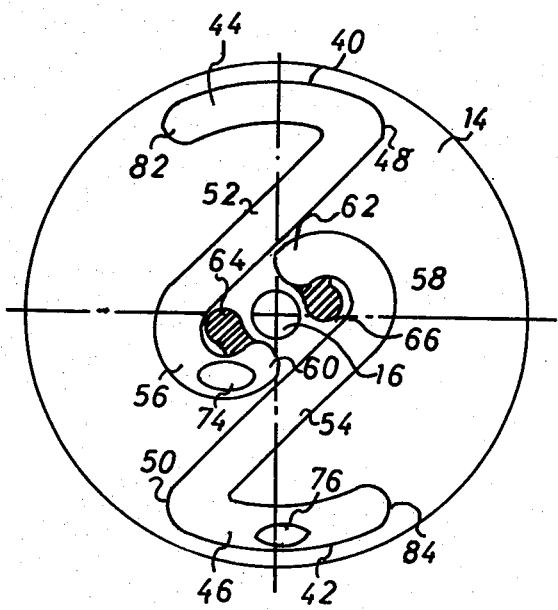
FIG. 1 is a plan view of a device constructed in accordance with the invention.

The device for erecting and stabilizing a gyro vertical 10 is designated 12. It contains a disc 14 which is arranged concentrical and perpendicular to the spin axis 16 of the gyro vertical. The disc 14 is mounted for rotation about the spin axis 16 on a pin 20 provided on the housing 18 of the gyro vertical 10. The gyro vertical 10 comprises an inner stator 22 stationary with respect to the housing, and an outer rotor 24 which is mounted in the housing 18 in bearings 26,28. The rotor 24 carries a gear 30 which meshes with a gear 32. The gear 32, in turn, is connected to a gear 34 which meshes with a gear 36 on the disc 14. In this way the disc 14 is driven together with the rotor 24 of the gyro vertical at a large reduction of speed. The gyro housing 18 has bearing pins 38 extending perpendicular to the gyro spin axis.

As can best be seen from FIG. 1, the disc 14 contains two guideways 40 and 42 which are centrosymmetrical with respect to the gyro spin axis 16. Each of the guideways comprises a guideway portion 44 or 46, respectively, which is curved in an arc along the periphery of the circular disc 14 about the gyro spin axis 16.

A straight guideway portion 52 and 54, respectively, joins the ends 48 and 50, respectively, leading with respect to the rotary movement, of each of these arcuate guideway portions 44,46. The two straight guideway portions 52,54 are parallel and extend in opposite directions from the gyro spin axis 16. Each of these straight guideway portions 52,54 ends in a u-shaped, inwardly curved guideway portion 56 or 58, respectively.

The two ends 60,62 of these u-shaped, inwardly curved guideway portions 56 and 58, respectively, communicate with lug-shaped recesses 64 and 66, respectively extending substantially perpendicular to the ends 60 or 62, respectively, the bottom of said recesses being elevated with respect to the bottom of the remaining guideway and forms a ramp. This has been illustrated in FIG. 1 by hatching.

Figure 2:
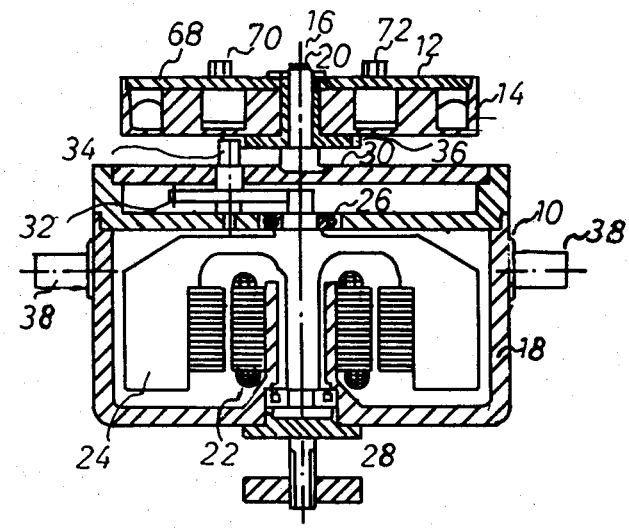
FIG. 2 is a vertical sectional view of a gyro vertical having a device according to the invention.
Figure 3:
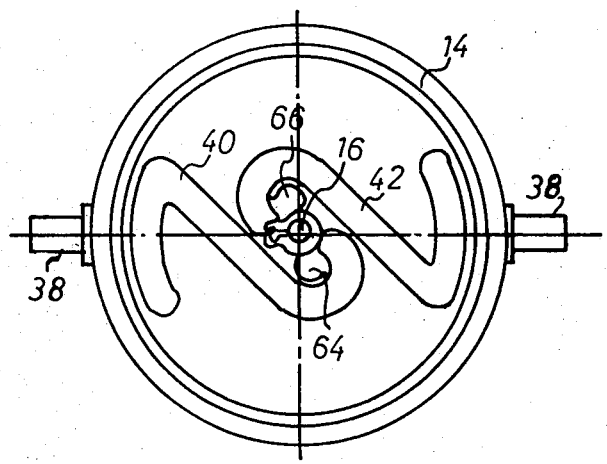
FIG. 3 is a plan view of the arrangement of FIG. 2.

As can be seen from FIG. 2, each guideway 40,42 comprises a groove, open at the top, in the disc 14, which is sealingly covered on its upper surface by a cover plate 68 attached to the disc 14 and preferably cemented thereto. Exhaust sockets 70,72 are provided on the cover plate 68 and permit evacuation of the guideways 40,42 or filling of the same with an inert gas.

Mercury drops 74 and 76, in the guideways 40 and 46 respectively, serve as movable masses.

Figure 4:
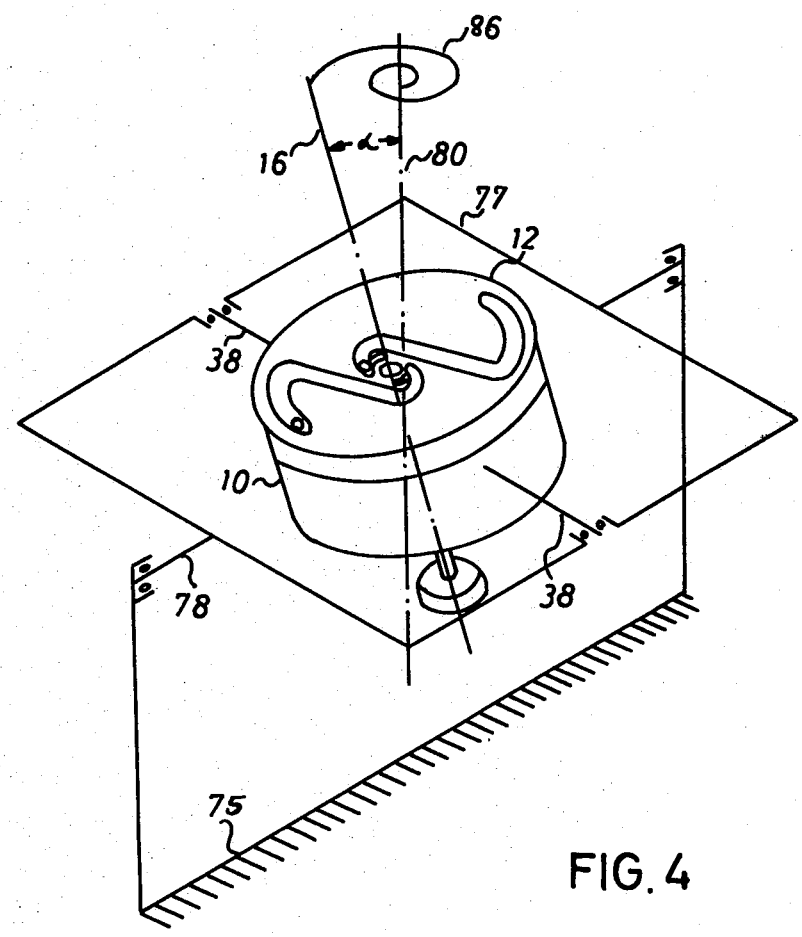
FIG. 4 is a schematic-perspective illustration of the gyro vertical with the device according to the invention.

FIG. 4 shows schematically the mounting of the gyro vertical 10 in a vehicle, which has been indicated at 74. Mounting is effected in conventional manner by means of a gimbal 76, which is mounted in the vehicle for rotation about an axis 78 and in which the gyro vertical 10, in turn, is mounted by means of its bearing pins for rotation about an axis perpendicular to axis 78. It has been assumed that the gyro vertical is tilted relative to the vertical direction 80 through an angle α, the angle α being shown here in exaggerated manner.

FIGS. 5 to 9 illustrate, how the device for erecting and stabilizing operates with such an inclination of the gyro vertical, the horizontal direction in FIGS. 5 to 9 corresponding to the axis of the pins 38.

Figure 5:
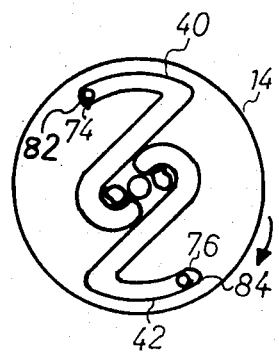
FIGS. 5 to 9 are plan views of the device for erecting and stabilizing the gyro vertical in the various angular positions of its revolution.

In the position of FIG. 5 the two mercury drops are at the rear ends 82 or 84, with respect to the rotary movement, of the arcuate guideway portions 40 and 42, respectively, and are centrosymmetrical to each other such that the disc 14 with the masses (mercury drops 74,76) is balanced in this position and does not exert any torque on the gyro.

After an angle of rotation of 25° the mercury drop 74 has run along the guideway portion 44 now continuously downwardly inclined, and further along the straight guideway portion 52 and the u-shaped, inwardly curved guideway portion 56 into the end 60 of this guideway portion. Thus the two mercury drops 74 and 76 are located on the same side of the gyro spin axis 16, whereby gravity acting on these two mercury drops 74,76 exerts a torque on the gyro vertical. This torque has one component acting about the horizontal axis in FIG. 6 but has also another component acting about the vertical axis in FIG. 6, the latter component acting in a sense to erect the gyro vertical.

Figure 7:
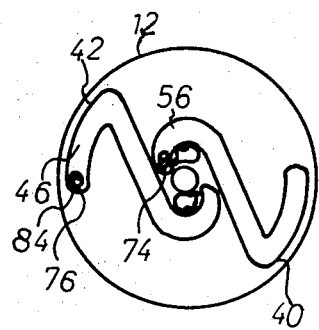

In the position of the disc 12 shown in FIG. 7, the two mercury drops 74 and 76 are taken along "uphill" within the end 60 of the u-shaped, curved guideway portion 56 and in the rear end 84 of the arcuate guideway portion 46. In this position a maximum torque acts about the vertical axis in FIG. 7 and thus a maximum erecting torque.

Figure 6:
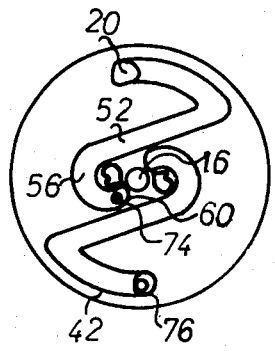
Figure 8:
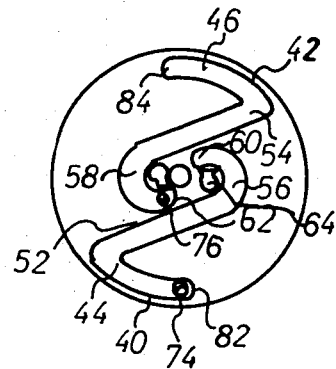

In the position of FIG. 8 the guideways 40 and 42 have exchanged their functions; the mercury drop 76 in the guideway 42 has run from the rear end 84 of the arcuate guideway portion 46 along this arcuate guideway portion 46 and the straight guideway portion 54 into the end 62 of the u-shaped, curved guideway portion 58. Instead, the mercury drop 74 of the guideway 42 has run from the end 60 of the u-shaped curved guideway portion 56 through the straight guideway portion 56 and the arcuate guideway portion 44 into the rear end 82 of the guideway 40. Again a torque of the kind of FIG. 6 is exerted.

Figure 9:
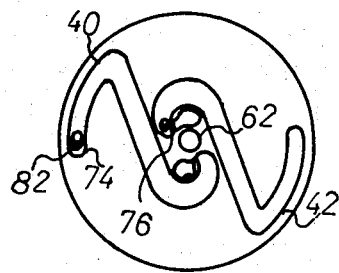

Upon a further rotation, as shown in FIG. 9, the torque exerted about the vertical axis in FIG. 9 increases to its maximum value, the mercury drops 74 and 76 in the rear end 84 of the guideway 40 and in the end 62 of the guideway 42 being conveyed uphill, until eventually after one complete revolution of the disc through 360° the mercury drop 76 runs again down to the low end and the state illustrated in FIG. 5 is reached again.

In this way a torque in erecting sense is continuously exerted on the gyro vertical. The torques as a whole cause the gyro vertical to precess into the vertical direction 80 along a spiral path 86, as indicated in FIG. 4.

If the angle exceeds a predetermined level, the mercury drop 76, between the position of FIG. 9 and the position of FIG. 5 then reached again, will run into the recess 66 while overcoming the ramp on the bottom thereof. In the same manner, the mercury drop 76, between the position of FIG. 7 and the position of FIG. 8, will run into the recess 64 instead of running again back along the guideway to the end 84. When the mercury droplets are retained in these recesses 64 and 66, respectively, they will circulate, during the rotation of the disc 12, only between the recesses 64 and 66 and the ends 60 and 62, respectively, of the guideway portions 52 and 54, respectively, without being able to get into the straight guideway portions 52 and 54, respectively. When the inclination of the spin axis 16 with respect to the apparent vertical has dropped again below a predetermined level (indicating that the transverse acceleration has ceased), the mercury drops 74 and 76 will no longer be able to overcome the ramps and to enter the recesses. Instead they will flow past the ramps and through the u-shaped guideway portions 56 and 58 and into the straight guideway portions 52 and 54, respectively, again. This will re-initiate the erection procedure described with reference to FIGS. 5 to 9. Thus when the angle between the gyro spin axis 16 and the observed vertical direction 18 exceeds a predetermined level, practically no erection torques will be exerted on the gyro by the mercury drops 72,74 captured at a small distance from the gyro spin axis 16. This prevents alignment of the gyro vertical with an apparent vertical, in the case of transverse acceleration and corresponding deviation of the apparent vertical from the true vertical direction.

Thus the recesses 64,66 act as capturing devices, which retain the mercury drops 72,74 within the inner ends of the guideways, when the deviation of the gyro spin axis 16 from the vertical direction observed exceeds a predetermined level, the mass distribution of the disc 14 and of the mercury drops 72,74 being such, due to the symmetrical arrangement, that substantially no erecting torque is exerted on the gyro 10, when the capturing device becomes effective.

Figure 10:
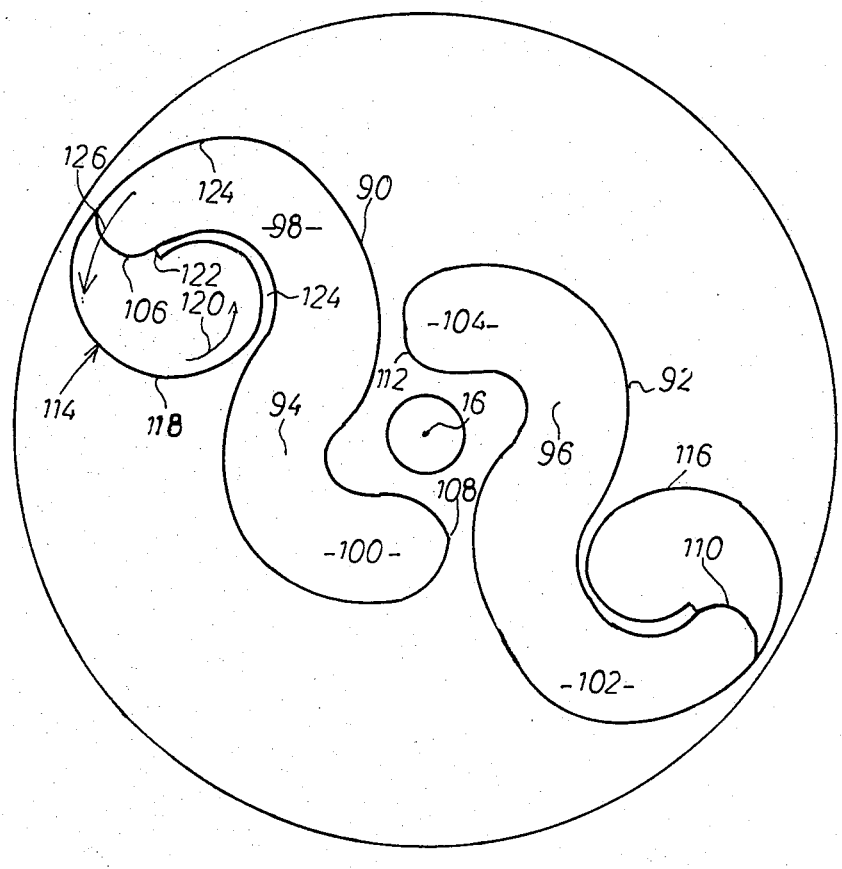
FIG. 10 shows a modified form of the guideways with lug-shaped recesses located at the outer end as capturing devices for the masses, when the gyro spin axis deviates heavily from the vertical direction observed.

In the embodiment of FIG. 10 also two guideways 90 and 92 arranged centrosymmetrical with respect to the gyro spin axis are provided in the disc 88. In this embodiment, however, each guideway is composed of two arcuate guideway portions 98 and 100, and 102 and 104, respectively, which are curved in opposite senses and interconnected in a point of inflection. The outer end 106,110 of the outer guideway portion 98 and 102, respectively, extends in generally peripheral direction of the disc 88. The inner guideway portion 100,104 extends in spiral shape around the gyro spin axis 16, whereby the inner end 108 or 112, respectively, of the guideway 90 or 92, respectively, is closer to the gyro spin axis 16 than the point of inflection 94 or 96, respectively.

In the embodiment of FIG. 10 the lug-shaped recesses 114,116 serving as capturing devices, are provided at the outer ends of the guideways 90,92. When the masses, for example mercury drops, are captured within the recesses 114,116, no erecting torque is exerted on the gyro because of the symmetrical arrangement.

The "capturing" of a mercury drop can be explained particularly well with reference to the design of the recesses 114,116.

With a small inclination of the disc 88, the mercury drop cannot run up the ramp into the recess 114. During the rotary movement, it is taken along, "uphill" by the end 106 of the guideway 90 and runs—with inclination about a horizontal axis in FIG. 10—"downhill," as soon as it has passed about the position shown, when the rotation is clockwise. With a certain angle of inclination of the gyro spin axis 16 relative to the vertical direction observed, which angle may be determined by the inclination of the ramp-shaped bottom of the recess 114, the mercury drop will no longer run into the guideway 90 along the ramp but will enter the recess 114 and lie on the bottom thereof at 118. Upon further rotation of the disc 88 it will move in the direction of the arrow 120 along the walls of the recess 114 up to the edge 122 of the arcuate partition 124 formed between the recess 114 and the guideway. From there the mercury drop will drop on the opposite wall 125 of the guideway 90, along which it will run back into the recess 114 in the direction of the arrow 126 upon further rotation of the disc 88.

The remaining construction is the same in the embodiment of FIG. 10 as in FIG. 2.

The embodiment of FIG. 10 causes substantially straight erection of the gyro 10, thus not an erection along a spiral path as 86.

Figure 11:
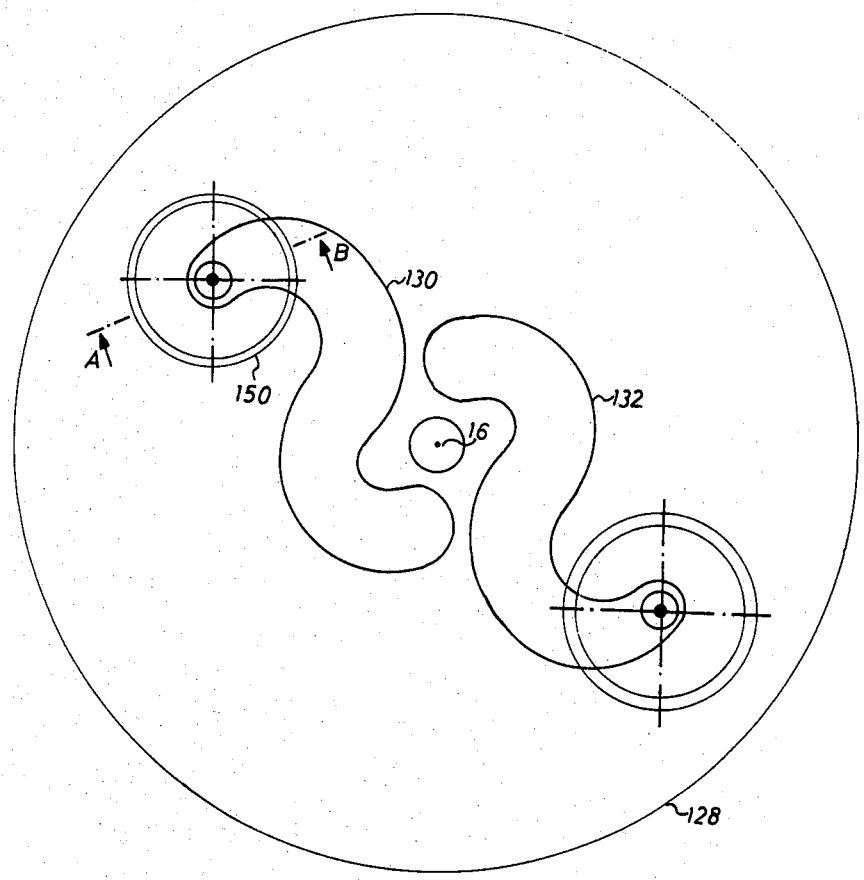
FIG. 11 shows an embodiment with guideways similar to FIG. 1 but with a different type of capturing device.
Figure 12:
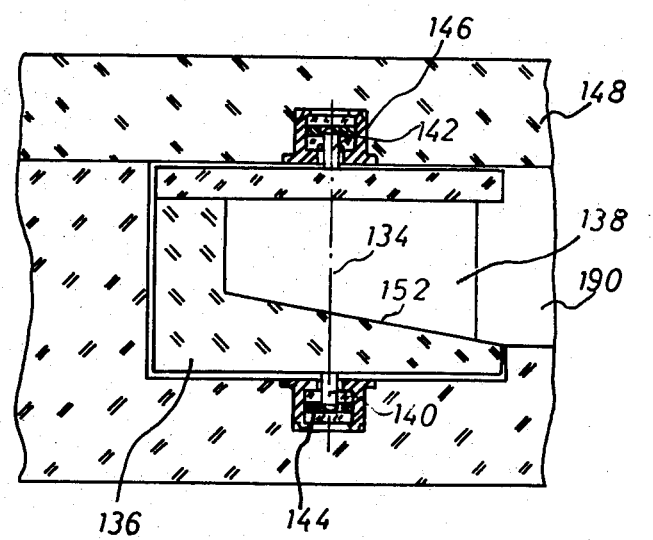
FIG. 12 is a sectional view at an enlarged scale taken along line A—B of FIG. 11.
Figure 13:
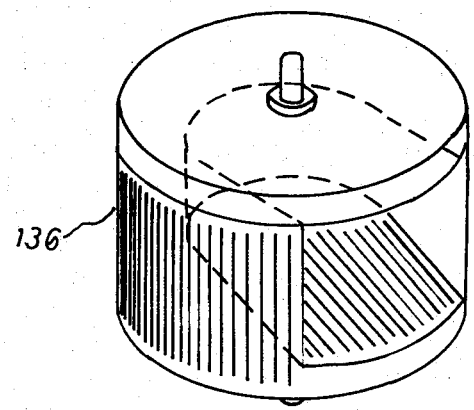
FIG. 13 is a perspective illustration of the capturing device of FIGS. 11 and 12.

In the embodiment of FIGS. 11 to 13, two guideways 130 and 132 are provided in a disc 128 and are also S-shaped and centrosymmetrical with respect to the gyro spin axis 16 and correspond, in shape and arrangement, to the guideways 90 and 92 of FIG. 10. Different as compared to FIG. 10 are the capturing devices, which are also located at the outer ends of the guideways 130,132.

As can best be seen from FIGS. 12 and 13, each capturing device comprises a capturing body 136, which is mounted for easy rotation at the radially outer end of the guideway 130,132, is unbalanced with respect to its axis of rotation 134 and has a cavity 138 on its side opposite to its center of gravity. The capturing body 136 is a cylindrical body, which is mounted by means of jewel bearings 144,146 in the disc 128 and in the cover plate 148 (corresponding to cover plate 68 of FIG. 2) attached to the disc 128 and covering the guideways 130,132. The cylindrical capturing body 136 is arranged within a correspondingly cylindrical recess 150 at the radially outer end of the guideway 130. The bottom 152 of the cavity 138 forms an inclined surface.

In its normal position the capturing body 136 is retained by the centrifugal force occuring during the rotation of the disc 128 (or otherwise) in a position, in which the cavity 138, as shown, is in a position in which the guideway 130 practically continuously extends into the cavity 138. As can be seen from FIG. 11, the cavity 138 is curved in the same sense as the guideway 130.

When the angle between the gyro spin axis 16 and the vertical direction observed exceeds a predetermined level, the mercury drop will not flow out of the cavity 138 into the guideway 130, after about the position illustrated in FIG. 11 has been passed, but the capturing body 136 with the mercury drop will rotate under the action of gravity such that the mercury drop is retained like in a vessel suspended from the disc 128 above its center of gravity. During a complete revolution of the disc the "vessel" maintains its position "downhill" with the mercury drop in its deepest point, such that it rotates through 360° relative to the disc 128 but prevents the mercury drop from running into the guideway 130 in any position. Only if a predetermined inclination of the gyro spin axis 16 relative to the vertical direction observed is fallen below again, the torque exerted by gravity on the capturing body 136 and the mercury drop becomes so small again, that it is overcome by the restoring torque, which may be caused by the centrifugal force, and the capturing body returns to the position illustrated.

In all cases also the impacts of the mercury drops on the ends of the guideways act in the sense of erecting the gyro. The bottom of the guideways may be convex or concave instead of plane. If the bottom is concave, the slope may be selected such that the centrifugal force acting on the mercury drop due to the rotation of the disc is compensated by a component of gravity. This results in increased accuracy of the alignment.

But also a convex bottom may be desirable under certain circumstances, for example in order to reduce the sensitivity of the erecting device with simple gyro verticals.

I claim:

1. Device for erecting and stabilizing of a gyro vertical, comprising a disc arranged on the gyro housing and perpendicular to the gyro axis, said disc being driven in the same sense as the gyro rotor but at a reduced rate as compared thereto, and having at least one guideway, in which a mass is movably guided, the guideway being arranged such that the disc with the mass is balanced with respect to the gyro axis, when the mass abuts the rear end, with respect to the rotary movement, of the guideway, and that the movement of the mass in the guideway causes an erecting torque, when the gyro spin axis deviates from the vertical direction observed, characterized in that the guideway (40,42;90,92;130,132) is generally S-shaped and extends from one end (82,84;106,108) located near the edge of the disc (14;88;128) around the gyro spin axis (16) to an end (60,62;110,112) located near the gyro spin axis (16).

2. Device for erecting and stabilizing of a gyro vertical, comprising a disc arranged on the gyro housing and perpendicular to the gyro axis, said disc being driven in the same sense as the gyro rotor but at a reduced rate as compared thereto, and having at least one guideway, in which a mass is movably guided, the guideway being arranged such that the disc with the mass is balanced with respect to the gyro axis, when the mass abuts the rear end, with respect to the rotary movement, of the guideway, and that the movement of the mass in the guideway causes an erecting torque, when the gyro spin axis deviates from the vertical direction observed, characterized in that the guideway (40,42; 90,92; 130,132) is generally S-shaped and extends from one end (82,84; 106,110) located near the edge of the disc (14; 88; 128) around the gyro spin axis (16) to an end (60,62; 108,112) located near the gyro spin axis (16), said guideway (40,42) comprising an arcuate guideway portion (44,46) curved around the gyro spin axis along the periphery of the disc (12), and a straight guideway portion (52,54) joining the end (48,50), leading with respect to the rotary movement, of the arcuate guideway portion (44,46), said straight guideway portion passing the gyro spin axis (16) at a small distance, and the straight guideway portion (52,54) ending in a u-shaped, inwardly curved guideway portion (56,58).

3. Device for erecting and stabilizing of a gyro vertical, comprising a disc arranged on the gyro housing and perpendicular to the gyro axis, said disc being driven in the same sense as the gyro rotor but at a reduced rate as compared thereto, and having at least one guideway, in which a mass is movably guided, the guideway being arranged such that the disc with the mass is balanced with respect to the gyro axis, when the mass abuts the rear end, with respect to the rotary movement, of the guideway, and that the movement of the mass in the guideway causes an erecting torque, when the gyro spin axis deviates from the vertical direction observed, characterized in that the guideway (40,42; 90,92; 130,132) is generally S-shaped and extends from one end (82,84; 106,110) located near the edge of the disc (14; 88; 128) around the gyro spin axis (16) to an end (60,62; 108,112) located near the gyro spin axis (16), said guideway (90,92) being composed of two arcuate guideway portions (98,100 or 102,104, respectively) which are curved in opposite senses and interconnected in a point of inflection, the outer end (106,110 of the outer guideway portion (98,102) extending in generally peripheral direction of the disc (88), and the inner guideway portion (100,104) extending around the gyro spin axis (16).

4. Device as set forth in claim 3, characterized in that the inner guideway portion (100,104) extends in spiral shape around the gyro spin axis (16), whereby the inner end (108,112) of the guideway (90,92) is closer to the gyro spin axis (16) than the point of inflection (94,96).

5. Device as set forth in anyone of the claims 2 or 3, characterized in that two guideways (40,42;90,92; 130,132) are provided, which are mutually centrosymmetrical with respect to the gyro spin axis (16) and contain one mass (74,76) each movable therein.

6. Device for erecting and stabilizing of a gyro vertical, comprising a disc arranged on the gyro housing and perpendicular to the gyro axis, said disc being driven in the same sense as the gyro rotor but at a reduced rate as compared thereto, and having a plurality of guideways, in each of which a mass is movably guided, the guideways being arranged such that the disc with the masses is balanced with respect to the gyro axis, when the masses abut the rear ends, with respect to the rotary movement, of the guideways, and that the movement of the masses in the guideways cause an erecting torque, when the gyro spin axis deviates from the vertical direction observed, characterized in that the guideways (40,42; 90,92; 130,132) are generally S-shaped and extend from ends (82,84; 106,110) located near the edge of the disc (14; 88; 128) around the gyro spin axis (16) to ends (60,62; 108,112) located near the gyro spin axis (16), said guideways being muturally centrosymmetrical with respect to the gyro spin axis (16).

7. Device as set forth in claim 6, characterized in that each guideway (40,42) is formed by a groove, open at the top, in the disc (12), which is sealingly covered by a cover plate (68) attached to the disc (14).

8. Device as set forth in anyone of the claims 2 through 4, 6 or 7, characterized in that each guideway (40,42) is formed by a groove, open at the top, in the disc (12), which is sealingly covered by a cover plate (68) attached to the disc (14).

9. Device as set forth in anyone of the claims 2 through 4, 6 or 7, characterized in that a capturing device is provided at one end of the guideway or each guideway, which device retains the mass in this end, when the deviation of the gyro spin axis from the vertical direction observed exceeds a predetermined value, the mass distribution of the disc and of the movable mass or masses being such that substantially no erecting torque will be exerted, when the capturing device becomes effective.

10. Device as set forth in claim 9, characterized in that the capuring device is a lug-shaped recess (64,66,114,116) which, at the end (60,62;106,110) of the guideway, extends substantially perpendicular to this end, and the bottom of which is elevated with respect to the bottom of the remaining guideway or is ramp-shaped.

11. Device as set forth in claim 9, characterized in that the capturing device comprises a capturing body (136), which is mounted for easy rotation at a radially outer end of the guideway (130,132), is unbalanced with respect to its axis of rotation and has a cavity (138) on its side opposite to its center of gravity.

12. Device as set forth in claim 10, characterized in that the bottom (158) of the cavity (138) is elevated with respect to the bottom of the guideway or is ramp-shaped.

13. Device for erecting and stabilizing of a gyro vertical, comprising a disc arranged on the gyro housing and perpendicular to the gyro axis, said disc being driven in the same sense as the gyro rotor but at a reduced rate as compared thereto, and having at least one guideway, in which a mass is movably guided, the guideway being arranged such that the disc with the mass is balanced with respect to the gyro axis, when the mass abuts the rear end, with respect to the rotary movement, of the guideway, and that the movement of the mass in the guideway causes an erecting torque, when the gyro spin axis deviates from the vertical direction observed, characterized in that the guideway (40,42; 90,92; 130,132) is generally S-shaped and extends from one end (82,84; 106,110) located near the edge of the disc (14; 88; 128) around the gyro spin axis (16) to an end (60,62; 108,112) located near the gyro spin axis (16), and that a capturing device is provided at one end of the guideway, which device retains the mass in this end, when the deviation of the gyro spin axis from the vertical direction observed exceeds a predetermined value, the mass distribution of the disc and of the movable mass being such that substantially no erecting torque will be exerted, when the capturing device becomes effective.

14. Device as set forth in claim 13, characterized in that the capturing device is a lug-shaped recess (64,66,114,116) which, at the end (60,62; 106,110) of the guideway, extends substantially perpendicular to this end, and the bottom of which is elevated with respect to the bottom of the remaining guideway or is ramp-shaped.

15. Device as set forth in claim 13, characterized in that the capturing device comprises a capturing body (136), which is mounted for easy rotation at a radially outer end of the guideway (130,132), is unbalanced with respect to its axis of rotation and has a cavity (138) on its side opposite to its center of gravity.

16. Device as set forth in claim 15, characterized in that the bottom (158) of the cavity (138) is elevated with respect to the bottom of the guideway or is ramp-shaped.

* * * * *

UNITED STATES PATENT AND TRADEMARK OFFICE
CERTIFICATE OF CORRECTION

PATENT NO. : 4,294,128
DATED : October 13, 1981
INVENTOR(S) : Peter Giesenberg

It is certified that error appears in the above-identified patent and that said Letters Patent are hereby corrected as shown below:

Col. 3, l. 60     "74" should be --75--
Col. 3, l. 62     "76" should be --77--
Claim 12, l. 1     "10" should be --11--

Signed and Sealed this

Thirtieth Day of March 1982

[SEAL]

Attest:

Attesting Officer

GERALD J. MOSSINGHOFF

Commissioner of Patents and Trademarks